United States Patent
Kim (10) Patent No.: US 6,587,144 B1
(45) Date of Patent: Jul. 1, 2003

(54) ANALOG SIGNAL PROCESSING APPARATUS FOR DIGITAL CAMERA

(75) Inventor: Min-Gyu Kim, Seoul (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 0 days.

(21) Appl. No.: 09/241,444

(22) Filed: Feb. 2, 1999

(30) Foreign Application Priority Data

May 11, 1998 (KR) .......................................... 1998-47297

(51) Int. Cl.[7] .......................... H04N 5/217; H04N 9/64
(52) U.S. Cl. ........................ 348/241; 348/243; 348/250
(58) Field of Search ............................. 348/241, 243, 348/250, 220.1; 382/270, 274

(56) References Cited

U.S. PATENT DOCUMENTS

| | | | |
|---|---|---|---|
| 5,121,117 A | * 6/1992 | Rabii | 348/512 |
| 5,512,947 A | 4/1996 | Sawachi et al. | |
| 6,005,613 A | * 12/1999 | Endsley et al. | 348/220.1 |
| 6,157,407 A | * 12/2000 | Kobayashi | 348/241 |

FOREIGN PATENT DOCUMENTS

JP 07-162713 * 6/1995 ............ H04N/5/18

* cited by examiner

Primary Examiner—Andrew Christensen
Assistant Examiner—Lin Ye
(74) Attorney, Agent, or Firm—Birch, Stewart, Kolasch & Birch, LLP

(57) ABSTRACT

An analog signal processing apparatus for a digital camera includes a correlated double sampling (CDS) circuit adjusting a direct current (DC) level signal from a charge coupled device (CCD) by using a black level as a reference and converting the DC level signal into a typical video signal, an automatic gain control (AGC) circuit automatically adjusting the gain of an output signal of the CDS circuit, an analog-to-digital (A/D) converter converting the analog signal from the AGC circuit into a digital image signal, a black level clamp circuit clamping the black level of the digital image signal from the A/D converter for a predetermined time interval and feeding back the clamped black level to the CDS circuit, and a clock generator generating first and second clock signals and a black level clamping signal so as to control the timing of the black level clamp circuit. The apparatus carries out a black level clamping with regard to the digital image signal that has passed through the A/D converter, thereby solving an offset problem which may occur in the conventional black level clamp circuit and A/D converter and accordingly implementing an accurate black level clamping. Further, a simplified digital comparison circuit is employed instead of a complicated analog comparator, thereby decreasing a chip area and power consumption.

13 Claims, 5 Drawing Sheets

ANALOG SIGNAL PROCESSING APPARATUS FOR DIGITAL CAMERA

BACKGROUND OF THE INVENTION

1. Field of the Invention

The present invention relates to a digital camera, and more particularly, to an improved analog signal processing apparatus for a digital camera which is capable of carrying out a black level clamping with regard to a digital-converted image signal.

2. Description of the Background Art

In general, in a digital camera, the light from a lens is converted into an electrical signal via a charge coupled device (CCD). The converted electrical signal is sampled using a black level as a reference to generate a typical video signal which is then converted to a digital image signal via respective signal processing steps. Eventually, the converted digital image signal is outputted via a digital signal processor (DSP).

The digital signal converting process of carrying out the respective signal processing steps with regard to the analog signal will now be described with reference to the accompanying drawings.

Figure 1:
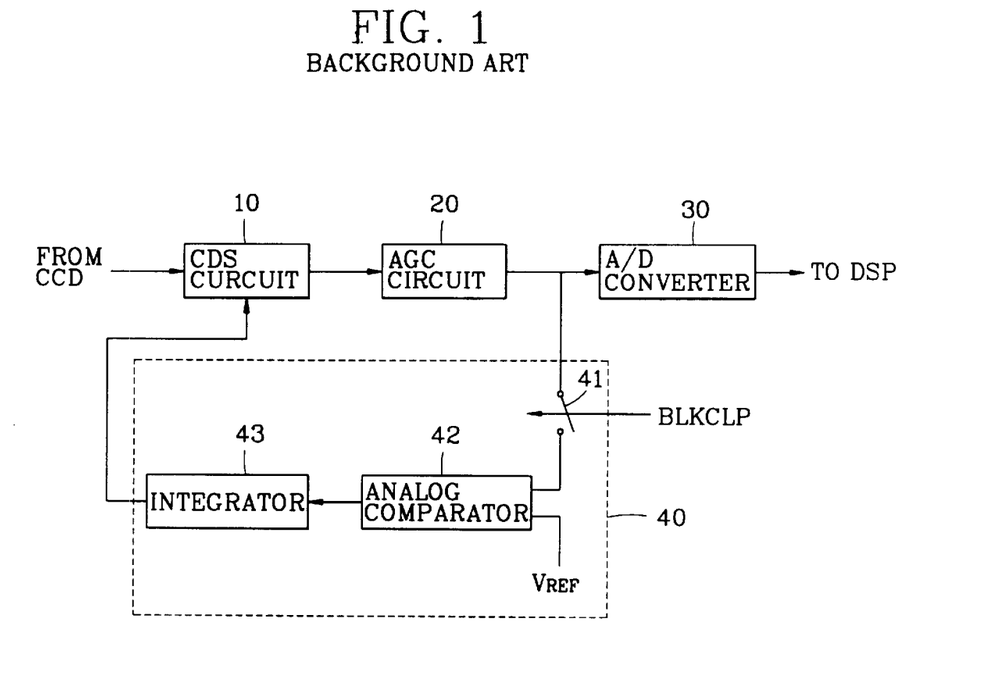
FIG. 1 is a schematic block diagram illustrating a conventional analog signal processing apparatus for a digital camera.

As shown in FIG. 1, a conventional analog signal processing apparatus for a digital camera includes a correlated double sampling (CDS) circuit 10 adjusting a direct current (DC) level of an electrical signal from a CCD (not shown) by using a black level as a reference and converting the DC level electrical signal into a typical video signal, an automatic gain control (AGC) circuit 20 adjusting the gain of the output signal of the CDS circuit 10 and outputting a signal amplified by as much as a predetermined gain, an analog-to-digital (A/D) converter 30 converting the analog signal from the AGC circuit 20 into a digital signal and outputting the converted signal to a DSP (not shown), and a black level clamp circuit 40 comparing a black level signal from the AGC circuit 20 and a preset black level reference value $V_{REF}$ and carrying out a black level clamping.

The black level clamp circuit 40 includes a switch 41 connected to an output of the AGC circuit 20 and turned on/off under the control of a black level clamping signal BLKCLP outputted at time intervals from a clock generator (not shown), an analog comparator 42 comparing a signal corresponding to the black level from the AGC circuit 20 and the preset black level reference value $V_{REF}$ in accordance with the turning on of the switch 41, and an integrator 43 determining an accurate black level required to the CDS circuit 10 in accordance with the compared result and applying the same to the CDS circuit 10.

The analog signal processing steps for the conventional digital camera will now be explained.

The signal from the CCD is converted into a typical video signal via the CDS circuit 10. At this time, the DC voltage of the video signal is adjusted with reference to a black level.

Here, the black level is adjusted at predetermined time intervals in accordance with the output of the black level clamp circuit 40.

The video signal formed by the CDS circuit 10 is applied to the AGC circuit 20 and amplified therein depending upon a gain value, and then converted into a digital video signal in the A/D converter 30.

Meanwhile, the switch 41 provided at the output terminal of the AGC circuit 20 is turned on/off in accordance with the black level clamping signal BLKCLP received at predetermined time intervals from the clock generator (not shown), and it transmits the output signal of the AGC circuit 20 to the analog comparator 42.

Figure 2:
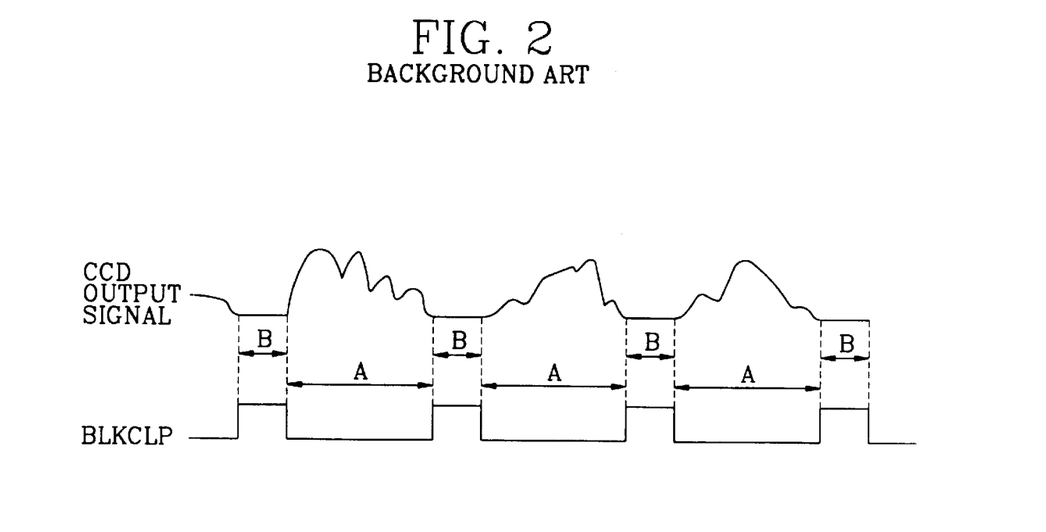
FIG. 2 is a waveform timing diagram illustrating a typical black level clamping signal.

As shown in FIG. 2, the black level clamping signal BLKCLP becomes active during non-image intervals B which occur between respective lines of a camera scan.

In the intervals B where the black level clamping signal BLKCLP becomes active, the switch 41 is turned on and accordingly a signal outputted from the AGC circuit 20 and corresponding to a black level is applied to the analog comparator 42.

Then, the analog comparator 42 compares the present black level signal from the AGC circuit 20 and the preset black level reference value $V_{REF}$. The integrator 43 levels up or down the black level value according to the compared result and feeds back the same to the CDS circuit 10.

As a result, when the CDS circuit 10 converts the electrical signal which is received from the CCD into a video signal in accordance with the output signal of the integrator 43 to a video signal, the black level as its reference is accurately corrected and the DC voltage level of the video signal is adjusted, accordingly.

As described above, in the conventional digital camera, it is difficult to maintain the preset black level due to error factors such as a process error and an offset which occur in respective blocks inside the system, so that the black level clamping circuit 40 is provided which clamps the black level at predetermined time intervals for its solution.

However, the conventional black level clamp circuit 40 has difficulty in solving the offset voltage generated from the analog comparator 42 or the integrator 43 in the black level clamp circuit 40, or the A/D converter 30 operating after the clamping performance. In order to solve the above drawbacks, an additional compensation block should be disadvantageously included in an initial circuit design.

SUMMARY OF THE INVENTION

The present invention is directed to overcoming the conventional disadvantages.

Therefore, it is an object of the present invention to provide an analog signal processing apparatus for a digital camera, capable of carrying out a black level clamping with regard to a digital-converted image signal.

To achieve the above-described object, there is provided an analog signal processing apparatus for a digital camera according to the present invention which includes a correlated double sampling (CDS) circuit adjusting a direct current (DC) level signal from a charge coupled device (CCD) by using a black level as a reference and converting the DC level signal to a typical video signal, an automatic gain control (AGC) circuit automatically adjusting the gain of an output signal of the CDS circuit, an analog-to-digital (A/D) converter converting the analog signal from the AGC circuit into a digital signal, a black level clamp circuit clamping the black level of a digital image signal from the A/D converter for a predetermined time interval and feeding back the same to the CDS circuit, and a clock generator generating first and second clock signals and a black level clamping signal so as to control the timing of the black level clamp circuit.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the resent invention, wherein.

DETAILED DESCRIPTION OF THE INVENTION

With reference to the accompanying drawings, the analog signal processing apparatus for a digital camera according to the present invention will now be described.

Figure 3:
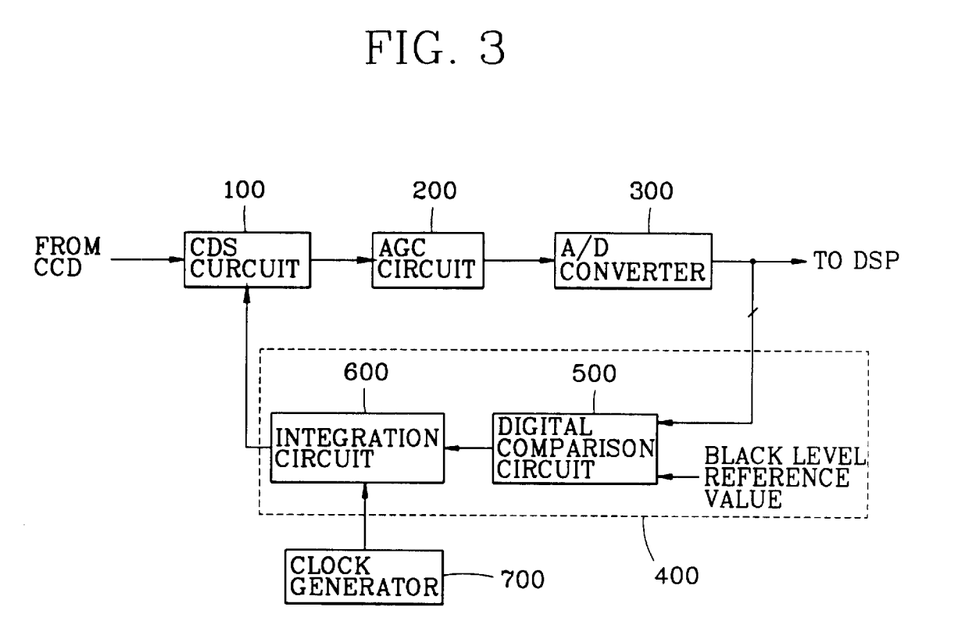
FIG. 3 is a schematic block diagram illustrating an analog signal processing apparatus for a digital camera according to the present invention.

FIG. 3 is a schematic block diagram illustrating an analog signal processing apparatus for a digital camera according to the present invention. As shown therein, the apparatus includes: a correlated double sampling (CDS) circuit 100 adjusting a DC level signal from a CCD (not shown) by using a black level as a reference and converting the DC level signal into a typical video signal; an automatic gain control (AGC) circuit 200 automatically adjusting the gain of the output signal of the CDS circuit 100; an analog-to-digital (A/D) converter 300 converting the analog signal from the AGC circuit 20 into a digital signal; a black level clamp circuit 400 clamping the black level of the digital image signal outputted from the A/D converter 300 for a predetermined time interval and feeding back the same to the CDS circuit 100; and a clock generator 700 generating first and second clock signals and a black level clamping signal so as to control the timing of the black level clamp circuit 400.

Here, the black level clamp circuit 400 includes a digital comparison circuit 500 comparing predetermined bits of the digital image signal from the A/D converter 300 and a preset black level reference value, and an integration circuit 600 clamping a predetermined black level value by leveling up or down the black level value in accordance with the output signal of the digital comparison circuit 500 and feeding back the same to the CDS circuit 100.

The operation of the analog signal processing apparatus according to the present invention will now be described with reference to the accompanying drawings.

The signal from the CCD (not shown) is converted into a typical video signal via the CDS circuit 100. At this time, the DC voltage of the video signal is adjusted using the black level as a reference.

Here, the black level is adjusted at predetermined time intervals according to the output of the black level clamp circuit 400. At this time, the DC voltage of the video signal is adjusted using the black level as a reference.

Also, the black level is adjusted at predetermined time intervals according to the output of the black level clamp circuit 400.

The video signal formed by the CDS circuit 100 is applied to the AGC circuit 200 and amplified in accordance with a predetermined gain value. The video signal is converted into the digital signal by the A/D converter 300.

The converted digital image signal is transmitted to a DSP (not shown) and also is applied to the digital comparison circuit 500 of the black level clamp circuit 400.

Then, the digital comparison circuit 500 compares the digital image signal and the preset black level reference value and outputs the result as a "high" or "low" signal. Here, the digital comparison circuit 500 may be implemented using a variety of digital logic circuits. As an example, the digital comparison circuit may be implemented as a general carry propagation logic (CPL) circuit as shown in FIG. 4.

Here, the black level reference value may be varied as needed and preferably it may be set at a range less than or equal to the bit number of the digital image signal. For example, assuming that the digital image signal from the A/D converter 300 is 10 bits, a 6-bit black level reference value may be employed.

Figure 4:
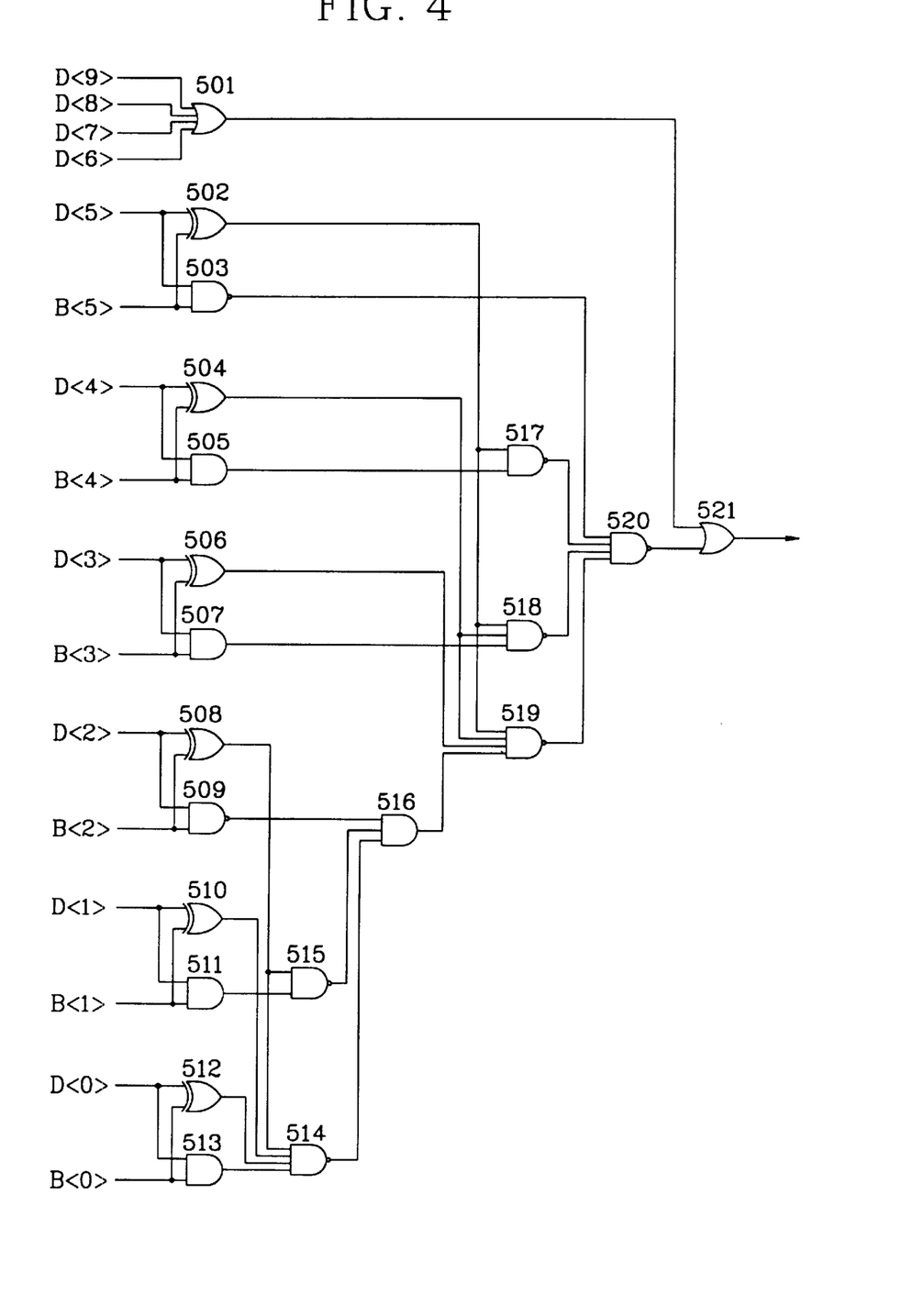
FIG. 4 is a detailed circuit view illustrating a digital comparison circuit in the apparatus of FIG. 3.

As shown in FIG. 4, the digital comparison circuit 500 implemented as a CPL circuit of the preferred embodiment of the present invention includes: an OR gate 501 receiving the 9th through 6th bits D<9>, D<8>, D<7>, D<6>of the digital image signal; an XOR gate 502 and NAND gate 503 each receiving a 5th bit D<5> of the digital image signal and a 5th bit B<5> of the black level reference value; an XOR gate 504 and an AND gate 505 each receiving a 4th bit D<4> of the digital image signal and a 4th bit B<4> of the black level reference value; an XOR gate 506 and an AND gate 507 each receiving a 3rd bit D<3> of the digital image signal and a 3rd bit B<3> of the black level reference value; an XOR gate 508 and an AND gate 509 each receiving a 2nd bit D<2> of the digital image signal and a 2nd bit B<2> of the black level reference value; an XOR gate 510 and an AND gate 511 each receiving a 1st bit D<1> of the digital image signal and a 1st bit B<1> of the black level reference value; an XOR gate 512 and an AND gate 513 each receiving a 0'th bit D<0> of the digital image signal and a 0'th bit B<0> of the black level reference value; a NAND gate 514 receiving respective output signals of the gates 508, 510, 512, 513; a NAND gate 515 receiving respective output signals of the gates 508, 511; an AND gate 516 receiving respective output signals of the gates 509, 514, 515; a NAND gate 517 receiving respective output signals of the gates 502, 505; a NAND gate 518 receiving respective output signals of the gates 502, 504, 507; a NAND gate 519 receiving respective output signals of the gates 502, 504, 506, 519; a NAND gate 520 receiving respective output signals of the gates 503, 517, 518, 519; and an OR gate 521 receiving respective output signals of the gates 501, 520.

The thusly constituted digital comparison circuit 500 outputs a "high" signal in case that one of the most significant 4 bits of the digital image signal is "1" or the least significant 6-bit value of the digital image signal is larger than the corresponding 6 bits of the black level reference value; otherwise, a "low" signal is output.

When the compared result of the digital comparison circuit 500 is applied to the integration circuit 600, the integration circuit 600 levels up or down the present black level value in accordance with the preset reference voltage and feeds back the result to the CDS circuit 100. That is, when the output signal of the digital comparison circuit 500 is a "high" level, the black level value of the present image signal is larger than the preset black level reference value, whereby the integration circuit 600 operates to lower the black level value; otherwise, a reverse operation is repeatedly carried out so as to be converged to an accurate black level value.

Figure 5:
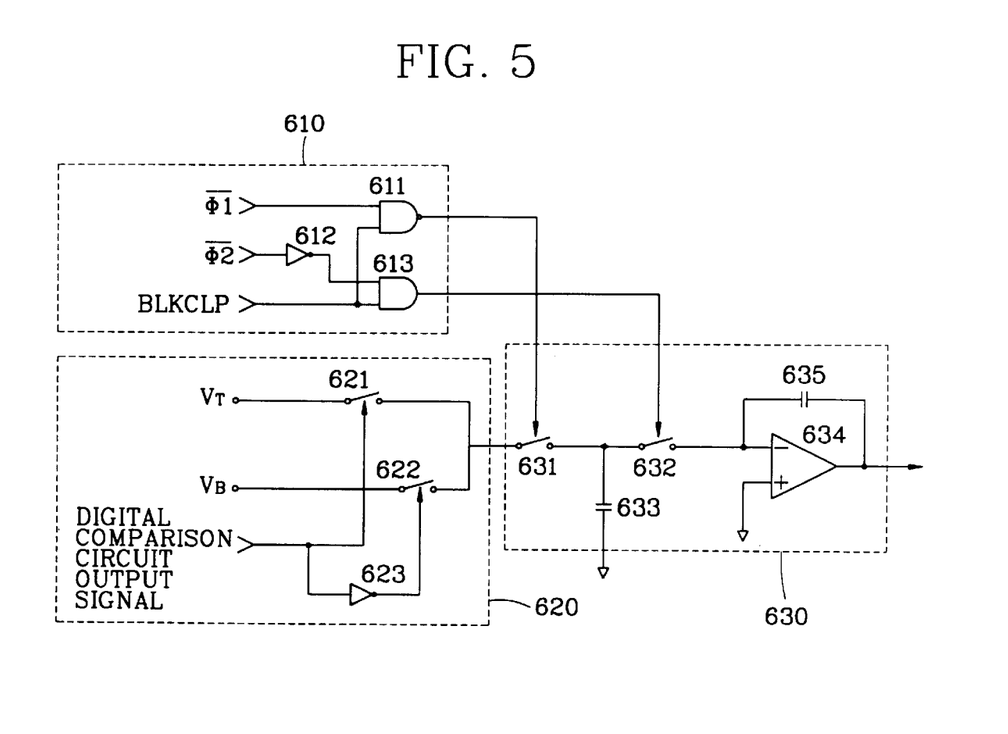
FIG. 5 is a detailed circuit view illustrating an integration circuit in the apparatus of FIG. 3.

FIG. 5 is a detailed circuit view of the integration circuit 600 in FIG. 3, wherein an integrator having a single input/output is illustrated.

As shown therein, the integration circuit 600 includes a control signal generator 610, a voltage applicator 620, and a switched-capacitor integrator 630.

The control signal generator 610 includes a NAND gate 611 NANDing a first clock signal from the clock generator 700 and a black level clamping signal BLKCLP and outputting a first control signal, an inverter 612 inverting a second clock signal $\overline{\phi 2}$ from the clock generator 700, and an AND gate 613 ANDing an output signal of the inverter 612 and the black level clamping signal BLKCLP and outputting a second control signal.

The voltage applicator 620 includes a switch 621 switching a top reference voltage $V_T$ in accordance with the output signal of the digital comparison circuit 500, an inverter 623 inverting the output signal of the digital comparison circuit 500, and a switch 622 switching a bottom reference voltage VB in accordance with the output signal of the inverter 623.

The switched-capacitor integrator 630 includes a switch 631 being turned on/off in accordance with the first control signal from the NAND gate 611 of the control signal generator 610, another switch 632 being turned on/off in accordance with the second control signal from the AND gate 613 of the control signal generator 610, a capacitor 633 charging or discharging in accordance with the on/off operation of the switches 631, 632, an operational amplifier 634 having its inverting input terminal connected to the switch 632 and its non-inverting input terminal connected to circuit ground and amplifying the voltage at the inverting input terminal thereof depending upon a predetermined amplification value, and a feedback capacitor 635 connected between the inverting input and output terminals of the operational amplifier 634.

The operation of the integration circuit 600 will now be described.

First, when the output signal of the digital comparison circuit is at a "low" level, the switch 621 of the voltage applicator 620 is turned on and accordingly the top reference voltage $V_T$ is applied to the switched-capacitor integrator 630. When the output signal of the digital comparison circuit 500 is at a "high" level, the switch 622 is turned on, so that the bottom reference voltage $V_B$ is applied to the switched-capacitor integrator 630.

Then, the switches 631, 632 of the switched-capacitor integrator 630 are turned on/of at predetermined time intervals in accordance with the first and second control signals from the control signal generator 610, so that the capacitor 633 charges or discharges the voltage from the voltage applicator 620.

The control signal generator 610 receives the first and second clock signals from the clock generator 700 and the black level clamping signal BLKCLP so as to generate the first and second control signals.

Figure 6:
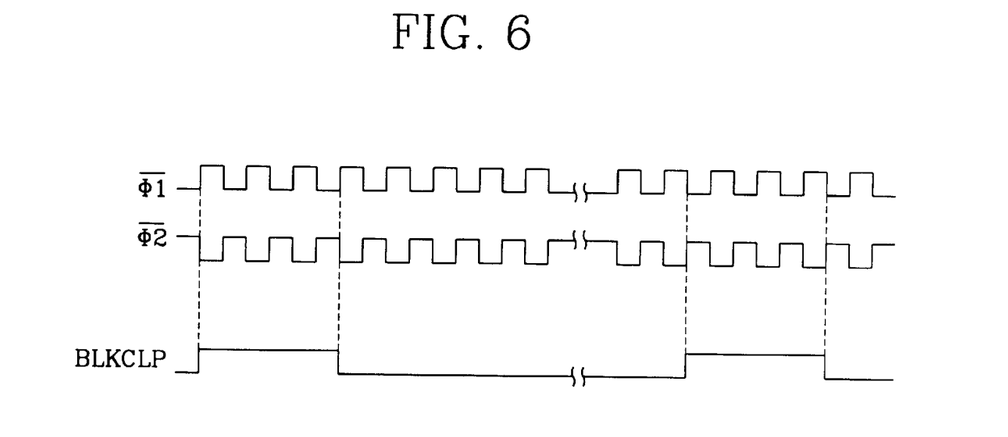
FIG. 6 is a waveform timing diagram illustrating a clock signal which controls the timing of the integration circuit.

The respective timing diagrams for the first and second clock signals $\overline{\phi 1}$, $\overline{\phi 2}$ from the clock generator 700 and the black level clamping signal BLKCLP are illustrated in FIG. 6.

The first and second clock signals $\overline{\phi 1}$, $\overline{\phi 2}$ are generated in the same way as the sampling clock of the CDS circuit 100, and the black level clamping signal BLKCLP represents a signal that becomes active in a non-image interval which occurs between respective lines of a camera scan.

In the control signal generator 610, the first clock signal $\overline{\phi 1}$ and the black level clamping signal BLKCLP are NANDed to output the first control signal, thereby turning on the switch 631, and an inverted version of the second clock signal $\overline{\phi 2}$ and the black level clamping signal BLKCLP are ANDed to output the second control signal for thereby turning on the witch 632.

When the switch 631 is turned on, the capacitor 633 becomes charged by the voltage from the voltage applicator 620. To the contrary, when the switch 632 is turned on, the discharging process is carried out.

The operational amplifier 634 amplifies the voltage at the inverting input terminal thereof, wherein the amplification value of the operational amplifier is determined in accordance with the capacitance ratio of the capacitor 633 and the feedback capacitor 635.

The black level clamping signal integrated for a predetermined time period by the switched-capacitor integrator 630 is fed back to the CDS circuit 100 which serves to adjust the DC level of the signals applied with reference thereto.

Figure 7:
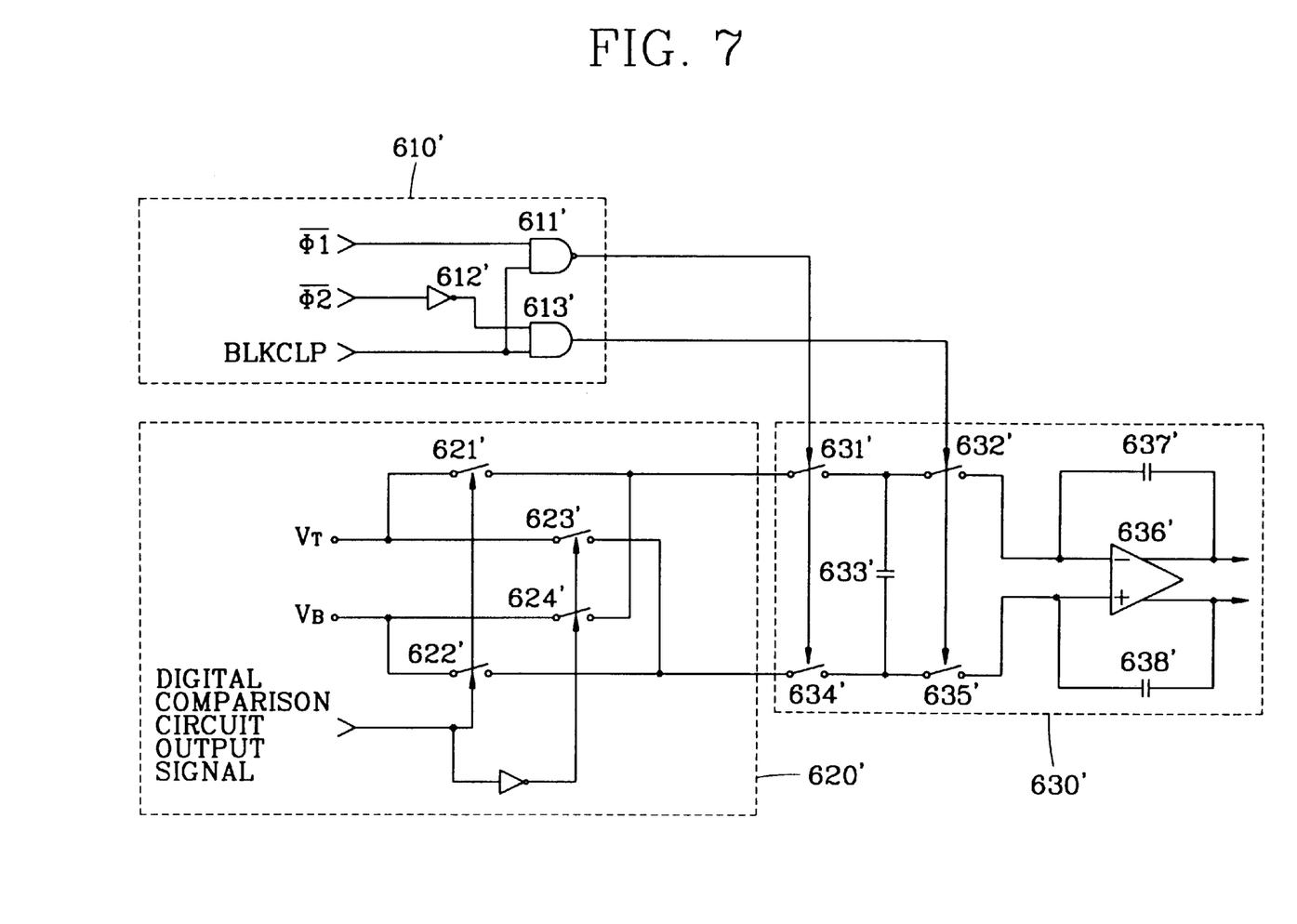
FIG. 7 is a detailed circuit view illustrating another embodiment of the integration circuit in the apparatus of FIG. 3.

Another embodiment of the integration circuit 600 is illustrated in FIG. 7, wherein a switched-capacitor integrator having a differential input/output is employed.

As shown therein, this second embodiment of the integration circuit 600 includes a control signal generator 610', a voltage applicator 620', and a switched-capacitor integrator 630'.

The control signal generator 610' includes a NAND gate 611' NANDing a first clock signal $\overline{\phi 2}$ from the clock generator 700 and the black level clamping signal BLKCLP and outputting a first control signal, an inverter 612' inverting a second clock signal Z from the clock generator 700, and an AND gate 613' ANDing an output signal of the inverter 612' and the black level clamping signal BLKCLP and outputting a second control signal.

The voltage applicator 620' includes switches 621', 622' for applying a top reference voltage $V_T$ and a bottom reference voltage $V_B$ to respective output nodes N1, N2 in accordance with the output signal of the digital comparison circuit 500, an inverter 625' inverting the digital comparison signal 500, and switches 623', 624' for reversely applying the top reference voltage $V_T$ and the bottom reference voltage $V_B$ to the respective output nodes N1, N2 in accordance with the output signal of the inverter 625'.

The switched-capacitor integrator 630' includes switches 631', 634' being turned on/off in accordance with the first control signal from the NAND gate 611' of the control signal generator 610', switches 632', 635' being turned on/off in accordance with the second control signal from the AND gate 613' of the control signal generator 610', a capacitor 633' being charged or discharged in accordance with the on/off operation of the switches 631', 632', 634', 635', an operational amplifier 636' having its inputs respectively connected to the switches 632', 635' and amplifying the voltage at the input terminal thereof depending upon a predetermined amplification value, and feedback capacitors 637', 638' connected between the respective input and output terminals of the operational amplifier 636'.

The operation of the second embodiment of the integration circuit 600 is similar to that of FIG. 5 and its description will be omitted accordingly.

In the integration circuit 600 having such a differential input/output, when the output signal of the digital comparison signal 500 is at a "low" level, the switches 621', 622' of the voltage applicator 620' are respectively turned on, so that the top reference voltage $V_T$ is applied to the node N1 and the bottom reference voltage $V_B$ is applied to the node N2. When the output signal of the digital comparison circuit 500 is at a "high" level, the switches 623', 634' are turned on, so that the bottom reference voltage $V_B$ is applied to the node N2 and the top reference voltage $V_T$ is applied to the node N1. As a result, the switched-capacitor integrator 630' charges or discharges the difference in the voltages applied to the nodes N1, N2.

As described above, the analog signal processing apparatus for a digital camera according to the present invention carries out a black level clamping with regard to the digital image signal that has passed through the A/D converter, thereby solving an offset problem which may occur in the conventional black level clamp circuit and A/D converter and accordingly implementing an accurate black level clamping. Further, a simplified digital comparison circuit is employed instead of a complicated analog comparator, thereby decreasing a chip area and power consumption.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. An analog signal processing apparatus for a digital camera, comprising:

a correlated double sampling (CDS) circuit adjusting a direct current (DC) level signal from a charge coupled device (CCD) by using a black level as a reference and converting the DC level signal into a typical video signal;

an automatic the gain control (AGC) circuit automatically adjusting gain of an output signal of the CDS circuit;

an analog-to-digital (A/D) converter converting an analog signal outputted from the AGC circuit into a digital image signal;

a black level clamp circuit clamping the black level of a digital image signal outputted from the A/D converter for a predetermined time interval and feeding back the clamped black level to the CDS circuit; and a clock generator generating first and second clock signals and a black level clamping signal so as to control the timing of the black level clamp circuit.

2. The apparatus of claim 1, wherein the black level clamp circuit comprises:

a digital comparison circuit comparing an n-bit digital image signal from the A/D converter and an m-bit preset black level reference value; and an integration circuit clamping a predetermined black level value by leveling up or down the black level value in accordance with an output signal of the digital comparison circuit and feeding back the clamped black level value to the CDS circuit.

3. The apparatus of claim 2, wherein the integration circuit comprises:

a voltage applicator having one or two output terminals for selectively applying a predetermined voltage value in accordance with an output signal of the digital comparison circuit or an inverted version thereof;

a switched-capacitor integrator having a single or differential input/output, charging or discharging the voltage from the voltage applicator under the control of a control signal, for integrating the voltage from the voltage applicator for a predetermined time period; and a control signal generator receiving first and second clock signals from the clock generator and the black level clamping signal and generating first and second control signals to control a charge/discharge timing of the switched-capacitor.

4. The apparatus of claim 3, wherein the voltage applicator comprises:

a first switching means having one or two switches being turned on/off in accordance with an output signal of the digital comparison circuit;

an inverter inverting the output signal of the digital comparison signal; and a second switching means having one or two switches being turned on/off in accordance with the output signal of the inverter.

5. The apparatus of claim 3, wherein the switched-capacitor integrator comprises:

a first switching means having one or more switches being turned on/off in accordance with the first control signal from the control signal generator;

a second switching means having one or more switches being turned on/off in accordance with the second control signal from the control signal generator;

a first capacitor being charged or discharged in accordance with an on/off operation of the first and second switching means;

an operational amplifier connected to the second switching means and amplifying a voltage at input terminals thereof in accordance with a predetermined amplification value; and one or two feedback capacitors connected between input and output terminals of the operational amplifier.

6. The apparatus of claim 5, wherein the amplification value of the operational amplifier is determined in accordance with a capacitance ratio of the first capacitor and the feedback capacitor.

7. The apparatus of claim 3, wherein the control signal generator comprises:

a NAND gate NANDing the first clock signal from the clock generator and the black level clamping signal, and outputting the first control signal;

an inverter inverting the second clock signal from the clock generator; and an AND gate ANDing an output signal of the inverter and the black level clamping signal, and outputting the second control signal.

8. The apparatus of claim 2, wherein the digital comparison circuit is implemented using a carry propagation logic (CPL) circuit.

9. The apparatus of claim 2, wherein the bit number m of the black level reference value is equal to or less than the bit number n of the digital image signal.

10. The apparatus of claim 1, wherein the first and second clock signals have reverse phases from each other.

11. The apparatus of claim 7, wherein the first and second clock signals have reverse phases from each other.

12. The apparatus of claim 1, wherein the black level clamping signal is a signal becoming active in non-image intervals existing between respective lines of a camera screen.

13. The apparatus of claim 7, wherein the black level clamping signal is a signal becoming active in non-image intervals existing between respective lines of a camera screen.

* * * * *